United States Patent
Jiang et al.

(10) Patent No.: US 10,037,115 B2
(45) Date of Patent: Jul. 31, 2018

(54) TOUCH DISPLAY PANEL, DISPLAY DEVICE AND DRIVING METHOD THEREOF

(71) Applicants: Boe Technology Group Co., Ltd., Beijing (CN); Hefei Xinsheng Optoelectronics Technology Co., Ltd., Anhui (CN)

(72) Inventors: Liangliang Jiang, Beijing (CN); Jie Yan, Beijing (CN); Lei Guo, Beijing (CN)

(73) Assignees: BOE TECHNOLOGY GROUP CO., LTD., Beijing (CN); HEFEI XINSHENG OPTOELECTRONICS TECHNOLOGY CO., LTD., Anhui (CN)

( * ) Notice: Subject to any disclaimer, the term of this patent is extended or adjusted under 35 U.S.C. 154(b) by 0 days.

(21) Appl. No.: 15/198,986

(22) Filed: Jun. 30, 2016

(65) Prior Publication Data
US 2017/0249031 A1   Aug. 31, 2017

(30) Foreign Application Priority Data

Feb. 25, 2016   (CN) .......................... 2016 1 0105447

(51) Int. Cl.
*G06F 3/044*  (2006.01)
*G06F 3/041*  (2006.01)

(52) U.S. Cl.
CPC ............ *G06F 3/044* (2013.01); *G06F 3/0412* (2013.01); *G06F 3/0416* (2013.01); *G06F 2203/04105* (2013.01); *G06F 2203/04111* (2013.01)

(58) Field of Classification Search
None
See application file for complete search history.

(56) References Cited

U.S. PATENT DOCUMENTS

| 2008/0062148 A1* | 3/2008 | Hotelling | ............ G02F 1/13338 345/174 |
| 2010/0053103 A1* | 3/2010 | No | .......................... G06F 3/044 345/173 |

(Continued)

FOREIGN PATENT DOCUMENTS

| CN | 101713878 | 5/2010 |
| CN | 102262473 | 11/2011 |

(Continued)

OTHER PUBLICATIONS

Office action from Chinese Application No. 201610105447.1 dated Jul. 26, 2016.

(Continued)

*Primary Examiner* — Patrick Moon
(74) *Attorney, Agent, or Firm* — Calfee, Halter & Griswold LLP

(57) ABSTRACT

The embodiments of the present invention provide a touch display panel, a display device and a driving method thereof. The touch display panel comprises an array substrate and a counter substrate; the array substrate comprises a first basal substrate and a spacer, the spacer being arranged on a surface of the first basal substrate facing the counter substrate; the spacer comprises a primary spacer and an auxiliary spacer; each auxiliary spacer at least comprises a conductive portion facing the counter substrate; the height of the auxiliary spacer is less than the height of the primary spacer; the counter substrate comprises a second basal substrate and a touch structure, the touch structure is arranged on a surface of the second basal substrate facing the array substrate.

14 Claims, 4 Drawing Sheets

(56) References Cited

U.S. PATENT DOCUMENTS

| | | | | |
|---|---|---|---|---|
| 2010/0079381 | A1* | 4/2010 | Hayashi | G06F 3/044 345/172 |
| 2010/0156827 | A1* | 6/2010 | Joo | G02F 1/13338 345/173 |
| 2011/0304563 | A1* | 12/2011 | Cheng | G06F 3/0412 345/173 |
| 2012/0182254 | A1* | 7/2012 | Jang | G06F 3/03545 345/174 |
| 2012/0206664 | A1* | 8/2012 | Brown | G06F 3/0412 349/12 |
| 2013/0044074 | A1* | 2/2013 | Park | G02F 1/13338 345/174 |
| 2014/0247239 | A1* | 9/2014 | Jamshidi-Roudbari | G06F 3/0414 345/174 |
| 2015/0153887 | A1* | 6/2015 | Kim | G06F 3/044 345/173 |

FOREIGN PATENT DOCUMENTS

| | | |
|---|---|---|
| CN | 104145240 | 11/2014 |
| CN | 104503622 | 4/2015 |

OTHER PUBLICATIONS

Office action from Chinese Application No. 201610105447.4 dated Jul. 26, 2016.

Office Action from China Application No. 201610105447.4 dated Jan. 24, 2017.

Search Report for Chinese Patent Application No. 201610105447.4 dated May 16, 2016.

Search Report for Chinese Patent Application No. 201610105447.2 dated May 16, 2016.

Third Office Action for Chinese Patent Application No. 201610105447.4 dated Jun. 1, 2017.

\* cited by examiner

TOUCH DISPLAY PANEL, DISPLAY DEVICE AND DRIVING METHOD THEREOF

RELATED APPLICATIONS

The present application claims the benefit of Chinese Patent Application No. 201610105447.4, filed on Feb. 25, 2016, the entire disclosure of which is incorporated herein by reference.

FIELD OF THE INVENTION

The present invention relates to the field of touch control technology, particularly to a touch display panel, a display device and a driving method thereof.

BACKGROUND OF THE INVENTION

Human-computer interaction technology is one of the most popular research fields; moreover, the center of human-computer interaction technology is gradually transferred from system to user, while the identification of finger action has gradually become a main means of human-computer interaction. At present, in the field of display technology, human-computer interaction is mainly embodied in the touch control.

At present, the touch screen is mainly based on capacitive touch screen, which has the characteristics of accurate positioning, good touch feel and long service life.

However, the changing of external coupling capacitance or electric field caused by touching the surface of the touch screen with a finger can only achieve the identification of the touch position, and can not be used for sensing the magnitude of the applied pressure from the outside. For example, if the user wants to control the sound volume or brightness of the screen on the surface of the touch screen, for a conventional touch screen, the above mentioned functions can be achieved only by repeatedly pressing a fixed position of the surface, or sliding from left to right. For advanced human-computer interaction, many inconveniences exist; moreover, defects such as screen surface abrasion and scratch are apt to occur.

SUMMARY OF THE INVENTION

The embodiments of the present invention provide a touch display panel, a display device and a driving method thereof, realizing the identification of the touch position and pressure value, improving human-computer interaction.

To this end, embodiments of the present invention provide the following solutions.

According to a first aspect of the present invention, a touch display panel is provided. The touch display panel may comprise an array substrate and a counter substrate; the array substrate comprises a first basal substrate and a spacer, the spacer being arranged on a surface of the first basal substrate facing the counter substrate; the spacer comprises a primary spacer and an auxiliary spacer; each auxiliary spacer at least comprises a conductive portion facing the counter substrate; the height of the auxiliary spacer is less than the height of the primary spacer; the counter substrate comprises a second basal substrate and a touch structure, the touch structure is arranged on a surface of the second basal substrate facing the array substrate.

Optionally, the auxiliary spacer comprises 2~10 levels of sub-auxiliary spacers; a segment difference is between sub-auxiliary spacers of different levels.

Optionally, a material of the spacer is conductive polymer material or elastic polymer material doped with conductive particles.

Optionally, the auxiliary spacer comprises an insulating spacer body and a conductive layer arranged on a surface of the spacer body facing the counter substrate.

Further optionally, the array substrate further comprises a pixel electrode and a common electrode; the conductive layer is arranged on the same layer with the pixel electrode or the common electrode.

Optionally, the array substrate further comprises a color filter layer arranged on the first basal substrate.

Optionally, the touch structure comprises a first touch electrode and a second touch electrode, which are crosswise arranged with each other; the first touch electrode comprises a plurality of first sub-touch electrodes connected with each other directly; the second touch electrode comprises a plurality of second sub-touch electrodes, adjacent second sub-touch electrodes being connected through a bridge; the first touch electrode and the second touch electrode are insulated from each other; and the auxiliary spacer corresponds to the first touch electrode or the second touch electrode.

According to a second aspect of the present invention, a display device is provided. The display device comprises the above mentioned touch display panel.

According to a third aspect of the present invention, a driving method for the above mentioned display device is provided. The driving method comprises inputting a driving signal to a touch electrode of the touch structure line by line, and receiving a feedback signal for identifying a touch position and pressure value.

Optionally, the steps of inputting a driving signal to a touch electrode of the touch structure line by line, and receiving a feedback signal for identifying a touch position and pressure value comprise: during a first predetermined period, inputting a driving signal to a touch electrode of the touch structure line by line, and receiving a feedback signal for identifying a touch position; during a second predetermined period, inputting a driving signal to a touch electrode of the touch structure line by line, and receiving a feedback signal for identifying a pressure value; the first predetermined period and the second predetermined period are arranged alternately.

Optionally, a duration of the first predetermined period and a duration of the second predetermined period are respectively a duration of one image frame.

The embodiments of the present invention provide a touch display panel, a display device and a driving method thereof. On one hand, by arranging a touch structure on the counter substrate, identification for the touch position can be realized; on the other hand, each auxiliary spacer at least comprises a conductive portion facing the counter substrate, the height of the auxiliary spacer is less than the height of the primary spacer, thus a coupling capacitance can be generated between the auxiliary spacer and the corresponding touch electrode of the touch structure. By applying pressures with different values, different coupling capacitances can be obtained, thereby identifying different pressure values based on the variation degree of the coupling capacitance. Therefore, an advanced touch control function with more responses can be provided, improving the intellectualization and communication level for human-computer interaction, enhancing the competitiveness and functional characteristics of the product.

BRIEF DESCRIPTION OF THE DRAWINGS

In order to more clearly illustrate the technical solutions in embodiments of the invention or in the prior art, the appended drawings needed to be used in the description of the embodiments or the prior art will be introduced briefly in the following. Obviously, the drawings in the following description are only some embodiments of the invention, and for those of ordinary skills in the art, other drawings may be obtained according to these drawings under the premise of not paying out creative work.

DETAILED DESCRIPTION OF THE INVENTION

Figure 1:
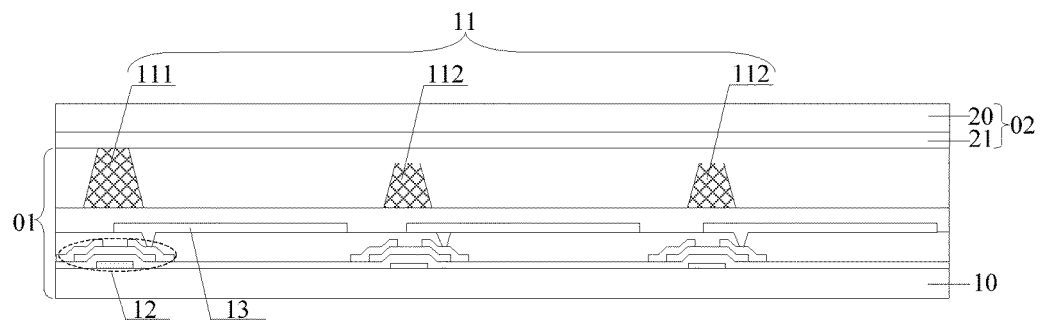
FIG. 1 is a structural schematic diagram of a touch display panel according to an embodiment of the present invention.

In the following, the technical solutions in embodiments of the invention will be described clearly and completely in connection with the drawings in the embodiments of the invention. Obviously, the described embodiments are only part of the embodiments of the invention, and not all of the embodiments. Based on the embodiments in the invention, all other embodiments obtained by those of ordinary skills in the art under the premise of not paying out creative work pertain to the protection scope of the invention.

Reference signs: 01—array substrate; 02—counter substrate; 10—first basal substrate; 11—spacer; 111—primary spacer; 112—auxiliary spacer; 112a—spacer body; 112b—conductive layer; 12—thin film transistor; 13—pixel electrode; 14—common electrode; 15—color filter layer; 16—black matrix; 20—second basal substrate; 21—touch structure; 211—first sub-touch electrode; 212—second sub-touch electrode; 213—bridge; 214—insulating block.

As shown in FIG. 1-FIG. 5, the embodiments of the present invention provide a touch display panel. The touch display panel comprises an array substrate 01 and a counter substrate 02.

The array substrate 01 comprises a first basal substrate 10 and a spacer 11; the spacer 11 is arranged on a surface of the first basal substrate 10 facing the counter substrate 02; the spacer 11 comprises a primary spacer 111 and an auxiliary spacer 112; each auxiliary spacer 112 at least comprises a conductive portion facing the counter substrate 02 (such as the conductive layer 112b shown in FIG. 4 and FIG. 5); the height of the auxiliary spacer 112 is less than the height of the primary spacer 111.

The counter substrate 02 comprises a second basal substrate 20 and a touch structure 21; the touch structure 21 is arranged on a surface of the second basal substrate 20 facing the array substrate 01.

It should be noted that: firstly, the array substrate 01 may also comprise elements such as a thin film transistor 12 and a pixel electrode located in each sub-pixel.

The thin film transistor may comprise a gate, a gate insulating layer, a semiconductor active layer, a source and a drain. The thin film transistor can be an amorphous silicon thin film transistor, a low temperature poly silicon thin film transistor, an oxide thin film transistor, or an organic thin film transistor, etc. In addition, the thin film transistor can be a thin film transistor of top gate type or a bottom gate type.

Secondly, those skilled in the art can understand that the function of the spacer 11 is to support the thickness of the box, so as to ensure the ability of the touch display panel for bearing a certain external pressure. Therefore, optionally, the spacer 11 has elasticity and resilience.

As for the auxiliary spacer 112, if the auxiliary spacer 112 only comprises only one level of sub-auxiliary spacers, all the auxiliary spacers 112 have the same height; if the auxiliary spacer 112 comprises more than one level of sub-auxiliary spacers, the auxiliary spacers 112 with the same height belong to a sub-auxiliary spacer of the same level. If the auxiliary spacer 112 comprises more than one level of sub-auxiliary spacers, the height of the sub-auxiliary spacers can increase or decrease level by level.

To simplify the process, if the auxiliary spacer 112 at least comprises a conductive portion facing the counter substrate 02, the primary spacer 111 is not limited to be conductive.

Thirdly, the specific structure of the touch structure 21 is not limited, as long as the touch position can be identified based on the touch of finger.

The touch structure can perform the identification of the touch position based on the variation of capacitance. In particular, when a finger touches the touch display panel, the electric field of the human body can be applied on the self capacitance or the mutual capacitance of the touch structure 21, thereby changing the capacitance value, so as to determine the touch position.

Based on this, a coupling capacitance is generated between the conductive auxiliary spacer 112 on the array substrate 01 and the corresponding touch electrodes in the touch structure 21 of the counter substrate 02. With the increase of pressure, the touch electrodes get close to and contact the spacers 11 with different heights, thereby changing the coupling capacitance accordingly. Therefore, the magnitude of the pressure value can be identified based on the variation degree of the coupling capacitance. Hence, the pressure values can be mapped to corresponding functions, so as to achieve advanced touch functions.

Fourthly, those skilled in the art can understand that, to realize color display, a color filter layer can be arranged in the touch display panel. In the embodiments of the present invention, the color filter layer can be arranged on the array substrate 01; alternatively, the color filter layer can be arranged on the counter substrate 02.

The embodiments of the present invention provide a touch display panel. On one hand, by arranging a touch structure 21 on the counter substrate 02, identification for the touch position can be realized; on the other hand, each auxiliary spacer 112 at least comprises a conductive portion facing the counter substrate 02, the height of the auxiliary spacer 112 is less than the height of the primary spacer 111, thus a coupling capacitance can be generated between the auxiliary spacer 112 and the corresponding touch electrode of the touch structure 21. By applying pressures with different values, different coupling capacitances can be obtained, thereby identifying different pressure values based on the variation degree of the coupling capacitance. Therefore, an advanced touch control function with more responses can be provided, improving the intellectualization and communication level for human-computer interaction, enhancing the competitiveness and functional characteristics of the product.

Optionally, the auxiliary spacer 112 may comprise 2~10 levels of sub-auxiliary spacers; a segment difference is between sub-auxiliary spacers of different levels. In the context of the present disclosure, the "segment difference" refers to a height difference between the auxiliary spacers.

Figure 2:
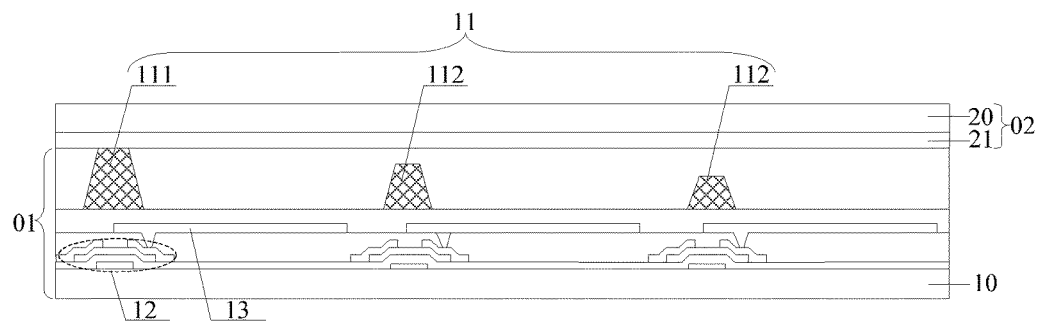
FIG. 2 is a structural schematic diagram of a touch display panel according to another embodiment of the present invention.

As shown in FIG. 2, the auxiliary spacer 112 comprises 2 levels of sub-auxiliary spacers, which can realize the detection of three pressure values. The higher auxiliary spacer 112 among the 2 levels of sub-auxiliary spacers can be referred as a first level sub-auxiliary spacer; the lower auxiliary spacer 112 can be referred as a second level sub-auxiliary spacer.

Figure 6A:
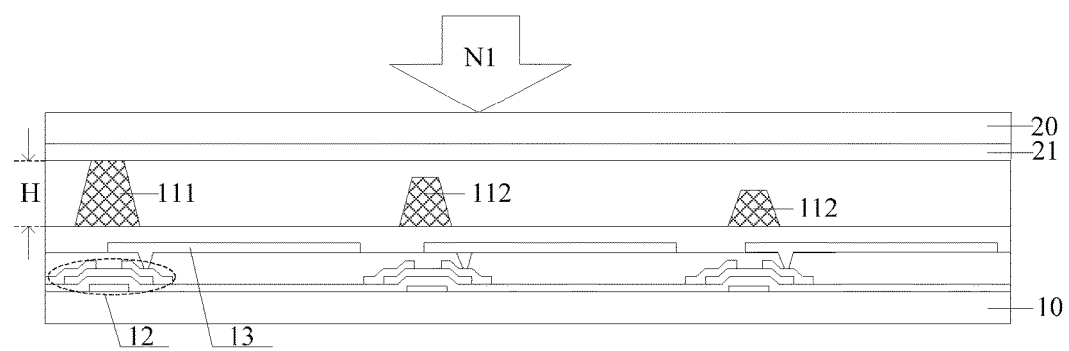
FIG. 6a-FIG. 6c are schematic diagrams showing thickness variation of a touch display panel under different pressures according to an embodiment of the present invention.

When a pressure N1 is applied on the touch display panel, as shown in FIG. 6a, the primary spacer 111 is compressed; the thickness of the touch display panel is H; the touch electrodes located on the counter substrate 02 gradually get close to the first level sub-auxiliary spacers. In such a situation, a coupling capacitance C1 is generated between the touch electrode in the touch area and the corresponding auxiliary spacer 112 (including the first level sub-auxiliary spacers and the second level sub-auxiliary spacers), upon which a corresponding pressure value can be obtained.

Figure 6B:
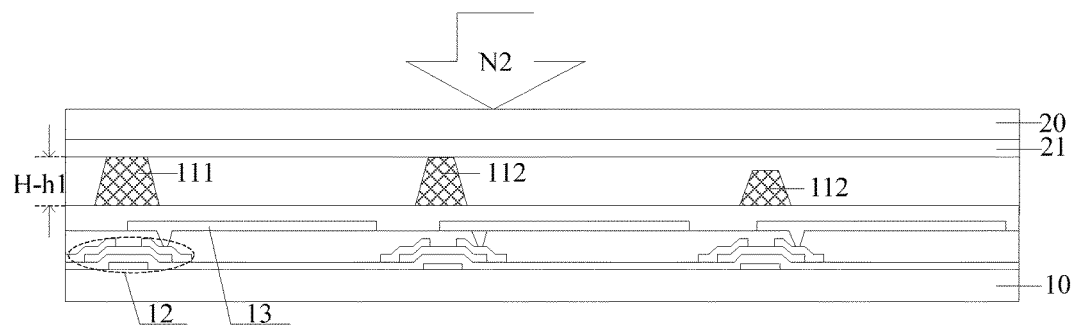

When the pressure applied on the touch display panel is increased to N2, as shown in FIG. 6b, the primary spacer 111 is further compressed; the thickness of the touch display panel is H-h1; the touch electrodes located on the counter substrate 02 contact the first level sub-auxiliary spacers. In such a situation, a coupling capacitance C2 is generated between the touch electrode in the touch area and the corresponding auxiliary spacer 112 (including the first level sub-auxiliary spacers and the second level sub-auxiliary spacers), upon which a corresponding pressure value can be obtained.

Figure 6C:
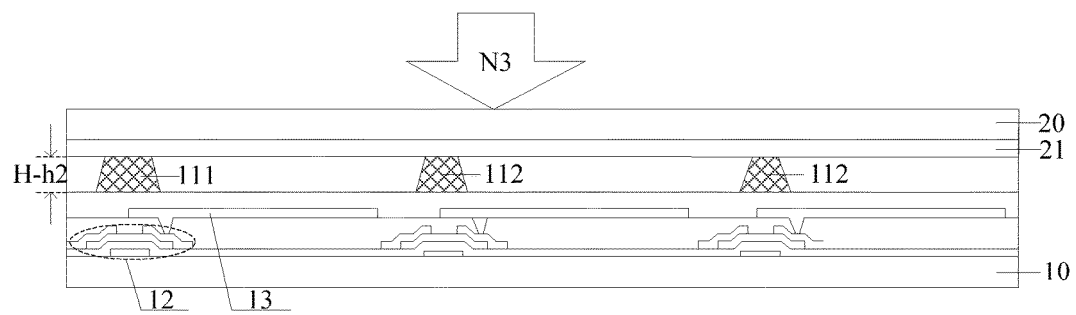

When the pressure applied on the touch display panel is increased to N3, as shown in FIG. 6c, the primary spacer 111 is further compressed; the thickness of the touch display panel is H-h2; the touch electrodes located on the counter substrate 02 fully contact the first level sub-auxiliary spacers and the second level sub-auxiliary spacers. In such a situation, a coupling capacitance C3 is generated between the touch electrode in the touch area and the corresponding auxiliary spacer 112 (including the first level sub-auxiliary spacers and the second level sub-auxiliary spacers), upon which a corresponding pressure value can be obtained.

Those skilled in the art can understand that with the structure of the embodiments of the present invention, during applying the pressure on the touch display panel, even if the touch electrode located on the counter substrate 02 is not in contact with the auxiliary spacer 112, the varied distance between the touch electrode and the auxiliary spacer can also change the coupling capacitance C1, C2 and C3. Therefore, the structure provided by the embodiment of the present invention can also be used to provide discrete or continuous pressure detection.

Figure 3:
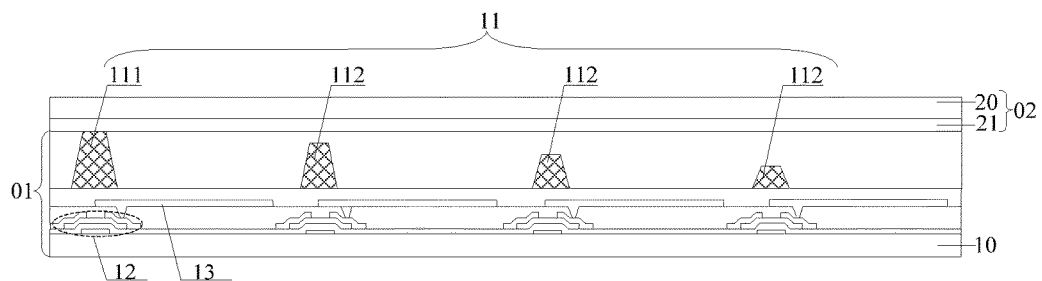
FIG. 3 is a structural schematic diagram of a touch display panel according to still another embodiment of the present invention.

An embodiment is shown in FIG. 3, in which the auxiliary spacer 112 comprises 3 levels of sub-auxiliary spacers; the embodiment can realize discrete or continuous detection of four pressure values.

Since the object of the pressure value detection is to trigger a certain function based on the pressure value (for example, control of the sound volume or screen brightness can be directly achieved based on different pressure values), only the correspondence between the coupling capacitance value and the pressure value should be established, without requirement for an accurate pressure value, as long as there is a relative change for the pressure value. Based on this, the capacitance value can be one-to-one mapped to the pressure value, and the one-to-one corresponding relationship can be arranged in advance.

In the embodiment of the present invention, by arranging at least 2 levels of auxiliary spacers, the detection of at least 3 pressure values can be realized, which can meet different needs and improve the user experience. Based on this, since different pressure values can directly correspond to the corresponding functions, it is possible to avoid the need for repeatedly pressing a fixed position or sliding on the surface of a conventional touch screen, which causes issues such as screen surface abrasion and scratch.

Optionally, as shown in FIG. 1-FIG. 3, a material of the spacer 11 is conductive polymer material or elastic polymer material doped with conductive particles.

Figure 4:
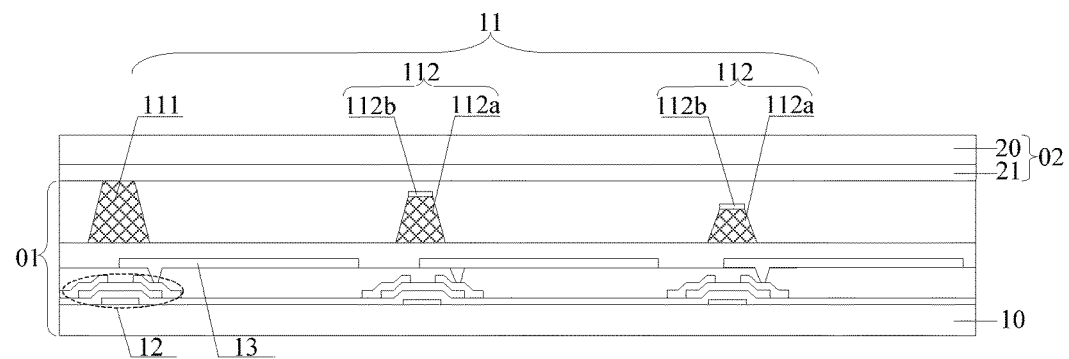
FIG. 4 is a structural schematic diagram of a touch display panel according to yet another embodiment of the present invention.
Figure 5:
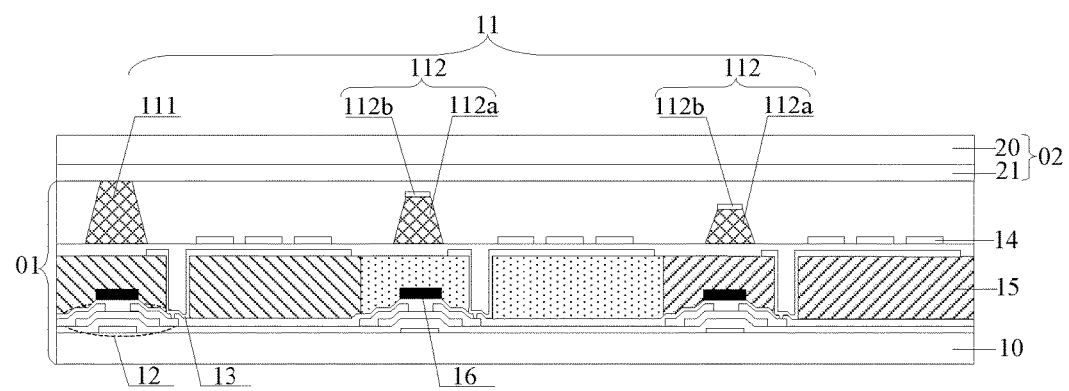
FIG. 5 is a structural schematic diagram of a touch display panel according to another embodiment of the present invention.

Alternatively, as shown in FIG. 4 and FIG. 5, the auxiliary spacer 112 comprises an insulating spacer body 112a and a conductive layer 112b arranged on a surface of the spacer body 112a facing the counter substrate 02.

The material of the insulating spacer body 112a can be a polymer material with high elasticity. In such a manner, a coupling capacitance between the auxiliary spacer 112 and the corresponding touch electrode can be generated, thereby realizing the detection for the pressure value.

If the auxiliary spacer 112 comprises the spacer body 112a and the conductive layer 112b, as shown in FIG. 5, optionally, the array substrate 01 further comprises a pixel electrode 13 and a common electrode 14; the conductive layer 112b is arranged on the same layer with the pixel electrode 13 or the common electrode 14. In such a manner, the composition processes can be reduced.

Optionally, as shown in FIG. 5, the array substrate can further comprise a color filter layer 15 arranged on the first basal substrate 10. The color filter layer 15 can comprise red photoresist, green photoresist and blue photoresist. The array substrate can also comprise a black matrix 16.

By arranging the color filter layer 15, the black matrix 16 and the spacer 11 on the array substrate, the embodiment of the present invention can be realized with the existing device and process of color filter substrate, ensuring the display effect.

Figure 7:
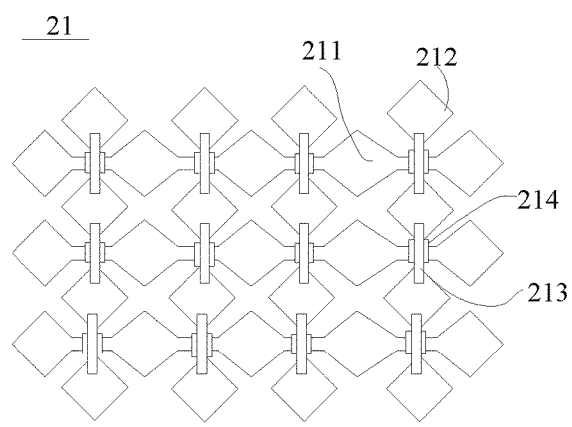
FIG. 7 is a structural schematic diagram of a touch structure according to an embodiment of the present invention.

Optionally, as shown in FIG. 7, the touch structure 21 comprises a first touch electrode and a second touch electrode, which are crosswise arranged with each other; the first touch electrode comprises a plurality of first sub-touch electrodes 211 connected with each other directly; the second touch electrode comprises a plurality of second sub-touch electrodes 212; adjacent second sub-touch electrodes 212 are connected through a bridge 213; the first touch electrode and the second touch electrode are insulated from each other; the auxiliary spacer 112 corresponds to the first touch electrode or the second touch electrode.

For example, if the first touch electrode is a touch driving electrode, the second touch electrode is a touch sensing electrode, and the auxiliary spacer 112 corresponds to the second touch electrode, the process of the embodiment of the invention realizing the identification for touch position and the detection for pressure value is: transmitting a driving signal line by line with the touch driving electrode, and receiving a sensing signal with the touch sensing electrode; if no touch occurs, the sensing signal received by the touch sensing electrode touch is fixed (i.e., the signal generated by the mutual capacitance between the touch driving electrode and the touch sensing electrode is fixed); when a touch occurs, due to the effect of the body electric field, the sensing signal received by the touch sensing electrode touch is changed, upon which the touch position can be determined. In this process, if a pressure is applied on the touch display panel during the touch, with the touch sensing electrode getting close to the conductive auxiliary spacer 112, the sensing signal received by the touch sensing electrode touch in this position is further changed. Therefore, based on the variation degree of the signal mutual capacitance reflected by the changes of the sensing signal, the pressure value can be measured.

It should be noted that no matter whether the auxiliary spacer 112 corresponds to the first touch electrode or the second touch electrode, if a pressure is applied on the touch display panel, the first touch electrode or the second touch electrode can sense the variation of the signal.

The first sub-touch electrode 211 and the second sub-touch electrode 212 can be arranged in the same layer, i.e., the first sub-touch electrode 211 and the second sub-touch electrode 212 can be formed with a one-time composition process; the material for them can be transparent conductive materials such as ITO (indium tin oxide).

The material for the bridge 213 can be a metal conductive material or a transparent conductive material.

In addition, insulation between the bridge 213 and the first touch electrode can be formed by arranging a whole layer of insulating material between them, or arranging an insulating block 214 only in the overlapping part.

An embodiment of the present invention provides a display device. The display device comprises the above mentioned touch display panel. In an embodiment of the present invention, the display device may further comprise an IC, which is connected with the touch electrode in the touch structure 21 of the touch display panel. In a further embodiment, the IC can also be electrically connected with the conductive portion of the auxiliary spacer 112.

In particular, the IC (or, an external circuit) can be used to supply a certain potential for the conductive portion of the auxiliary spacer 112, such that a mutual capacitance can be generated between the auxiliary spacer 112 and the corresponding touch electrode of the touch structure 21. If the touch structure 21 is used in self capacitance mode, the IC (or, an external circuit) may further transmit a driving signal to the touch electrode of the touch structure 21, and receive a feedback signal from the touch electrode (i.e., a sensing signal received by the touch electrode), thereby performing the identification for the touch position and pressure value. If the touch structure 21 is used in mutual capacitance mode, the IC (or, an external circuit) may transmit a driving signal to the first touch electrode of the touch structure 21, and receive a feedback signal from the second touch electrode, thereby performing the identification for the touch position and pressure value.

In the embodiments of the present invention, with the above mentioned touch display panel, the identification for the touch position and pressure value can be realized by arranging an IC, simplifying the wiring of the circuit board bearing the IC and reducing the cost.

Figure 8:
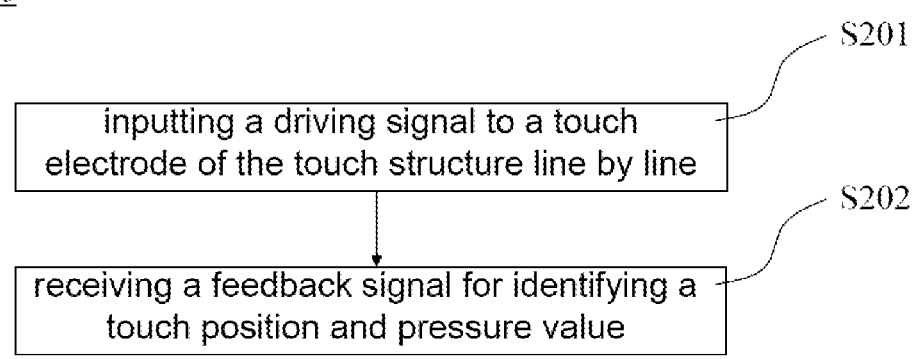
FIG. 8 is a flow chart of a driving method for a display device according to an embodiment of the present invention.

As shown in FIG. 8, an embodiment of the present invention provides a driving method 200 for the above mentioned display device. The driving method comprises: S201 inputting a driving signal to a touch electrode of the touch structure line by line, and S202 receiving a feedback signal for identifying a touch position and pressure value.

On one hand, when a touch occurs, the IC (or, an external circuit) can identify the touch position by addressing, based on the variation of the received feedback signal compared with the received feedback signal of no touch. On the other hand, if a pressure is applied on the touch display panel during the touch, the IC (or, an external circuit) can obtain the variation magnitude of the coupling capacitance through the received feedback signal, and identify the pressure value based on the corresponding relationship between the variation magnitude of the coupling capacitance and the pressure value. On this basis, based on the pressure value, a corresponding function can be triggered, so as to achieve advanced touch functions.

In particular, during each predetermined period (e.g., an image frame), a driving signal can be inputted into the touch electrode in the touch structure 21 line by line; a feedback signal can then be received, upon which the touch position and the pressure value can be identified simultaneously.

Alternatively, during a first predetermined period (e.g., a first image frame), a driving signal can be inputted into a touch electrode of the touch structure 21 line by line with the IC (or, an external circuit); a feedback signal is received for identifying a touch position. During a second predetermined period (e.g., a second image frame), a driving signal can be inputted into a touch electrode of the touch structure 21 line by line with the IC (or, an external circuit); a feedback signal is received for identifying a pressure value. The first predetermined period and the second predetermined period can be arranged alternately.

Optionally, a duration of the first predetermined period and a duration of the second predetermined period are respectively a duration of one image frame.

For example, in an original scanning time for one frame, the signal refresh frequency of the IC can be increased to scan two frames; the touch position can be identified in the first frame, and the pressure value can be identified in the second frame.

Compared with identifying both the touch position and the pressure value in one frame, by increasing the signal refresh frequency of the IC and identifying the touch position and the pressure value respectively in two frames, the requirement for the processing ability of the IC is reduced, reducing the cost.

The above embodiments are only used for explanations rather than limitations to the present invention, the ordinary skilled person in the related technical field, in the case of not departing from the spirit and scope of the present invention, may also make various modifications and variations, therefore, all the equivalent solutions also belong to the scope of the present invention, the patent protection scope of the present invention should be defined by the claims.

What is claimed is:

1. A touch display panel, comprising an array substrate and a counter substrate;
   wherein the array substrate comprises a first basal substrate and a spacer; the spacer is arranged on a surface of the first basal substrate facing the counter substrate; the spacer comprises a primary spacer and an auxiliary spacer; the first basal substrate comprises a plurality of thin film transistors; the primary spacer and the auxiliary spacer correspond to the plurality of thin film transistors one-to-one; each auxiliary spacer at least comprises a conductive portion facing the counter substrate; the height of the auxiliary spacer is less than the height of the primary spacer;

wherein the counter substrate comprises a second basal substrate and a touch structure, the touch structure arranged on a surface of the second basal substrate facing the array substrate;

and wherein a coupling capacitance is generated between the auxiliary spacer and the touch structure, and a pressure value can be identified based on a variation degree of the coupling capacitance.

2. The touch display panel according to claim 1, wherein the auxiliary spacer comprises 2~10 levels of sub-auxiliary spacers; a segment difference is between sub-auxiliary spacers of different levels.

3. The touch display panel according to claim 1, wherein a material of the spacer is conductive polymer material or elastic polymer material doped with conductive particles.

4. The touch display panel according to claim 1, wherein the auxiliary spacer comprises an insulating spacer body and a conductive layer arranged on a surface of the spacer body facing the counter substrate.

5. The touch display panel according to claim 4, wherein the array substrate further comprises a pixel electrode and a common electrode;
the conductive layer is arranged on the same layer with the pixel electrode or the common electrode.

6. The touch display panel according to claim 1, wherein the array substrate further comprises a color filter layer arranged on the first basal substrate.

7. The touch display panel according to claim 1, wherein the touch structure comprises a first touch electrode and a second touch electrode, which are crosswise arranged with each other;
wherein the first touch electrode comprises a plurality of first sub-touch electrodes connected with each other directly;
wherein the second touch electrode comprises a plurality of second sub-touch electrodes, adjacent second sub-touch electrodes being connected through a bridge;
wherein the first touch electrode and the second touch electrode are insulated from each other; and
wherein the auxiliary spacer corresponds to the first touch electrode or the second touch electrode.

8. A display device comprising the touch display panel according to claim 1.

9. The display device according to claim 8, wherein the auxiliary spacer comprises 2~10 levels of sub-auxiliary spacers; a segment difference is between sub-auxiliary spacers of different levels.

10. The display device according to claim 8, wherein a material of the spacer is conductive polymer material or elastic polymer material doped with conductive particles.

11. The display device according to claim 8, wherein the auxiliary spacer comprises an insulating spacer body and a conductive layer arranged on a surface of the spacer body facing the counter substrate.

12. The display device according to claim 11, wherein the array substrate further comprises a pixel electrode and a common electrode;
the conductive layer is arranged on the same layer with the pixel electrode or the common electrode.

13. The display device according to claim 8, wherein the array substrate further comprises a color filter layer arranged on the first basal substrate.

14. The display device according to claim 8, wherein the touch structure comprises a first touch electrode and a second touch electrode, which are crosswise arranged with each other;
wherein the first touch electrode comprises a plurality of first sub-touch electrodes connected with each other directly;
wherein the second touch electrode comprises a plurality of second sub-touch electrodes, adjacent second sub-touch electrodes being connected through a bridge;
wherein the first touch electrode and the second touch electrode are insulated from each other; and
wherein the auxiliary spacer corresponds to the first touch electrode or the second touch electrode.

* * * * *